United States Patent
Tang (10) Patent No.: US 12,022,552 B2
(45) Date of Patent: Jun. 25, 2024

(54) METHOD AND MOBILE COMMUNICATIONS DEVICE FOR MAINTAINING MOBILE COMMUNICATION CONTINUITY

(71) Applicant: MEDIATEK INC., Hsinchu (TW)

(72) Inventor: Hsin-Jun Tang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 47 days.

(21) Appl. No.: 17/677,344

(22) Filed: Feb. 22, 2022

(65) Prior Publication Data

US 2023/0269815 A1    Aug. 24, 2023

(51) Int. Cl.
| H04W 76/25 | (2018.01) |
| H04L 61/256 | (2022.01) |
| H04L 65/65 | (2022.01) |
| H04L 69/16 | (2022.01) |

(52) U.S. Cl.
CPC .......... *H04W 76/25* (2018.02); *H04L 61/256* (2013.01); *H04L 65/65* (2022.05); *H04L 69/16* (2013.01)

(58) Field of Classification Search
None
See application file for complete search history.

(56) References Cited

U.S. PATENT DOCUMENTS

| 7,280,557 B1 * | 10/2007 | Biswas | H04L 69/40 |
| | | | 370/465 |
| 2012/0281707 A1 * | 11/2012 | Muhanna | H04W 12/08 |
| | | | 370/401 |
| 2014/0359159 A1 * | 12/2014 | Diaz-Cuellar | H04L 63/0272 |
| | | | 709/235 |
| 2015/0127853 A1 * | 5/2015 | Roskind | H04L 61/2503 |
| | | | 709/245 |
| 2015/0236985 A1 * | 8/2015 | Chandramouli | H04W 28/0289 |
| | | | 370/328 |
| 2016/0088645 A1 * | 3/2016 | Burhan | H04L 47/24 |
| | | | 370/349 |
| 2016/0302153 A1 * | 10/2016 | Martin | H04W 76/27 |
| 2018/0152871 A1 | 5/2018 | Vanapalli | |
| 2018/0205713 A1 | 7/2018 | Yadav | |
| 2018/0352586 A1 * | 12/2018 | Pollack | H04W 52/0254 |
| 2018/0375824 A1 * | 12/2018 | Mayya | H04L 47/22 |
| 2020/0296554 A1 * | 9/2020 | Chiang | H04M 3/2272 |
| 2022/0294732 A1 * | 9/2022 | Hart | H04L 47/2483 |

OTHER PUBLICATIONS

Chinese language office action dated Nov. 7, 2023, issued in application No. TW 111143102.

* cited by examiner

*Primary Examiner* — Lonnie V Sweet (74) *Attorney, Agent, or Firm* — McClure, Qualey & Rodack, LLP (57) ABSTRACT

A method for maintaining mobile communication continuity, executed by a mobile communications device. The method includes: starting a timer when the mobile communications device receives a service packet from or transmits a service packet to a network; and detecting whether the network is reachable and whether a network address translation (NAT) mapping has changed when the mobile communications device does not receive a specific packet and the timer expires.

16 Claims, 7 Drawing Sheets

METHOD AND MOBILE COMMUNICATIONS DEVICE FOR MAINTAINING MOBILE COMMUNICATION CONTINUITY

BACKGROUND OF THE APPLICATION

Field of the Application

The present disclosure generally relates to the field of wireless communication technology. More specifically, aspects of the present disclosure relate to a method and mobile communications device for maintaining mobile communication continuity.

Description of the Related Art

In a typical mobile communication environment, a UE (User Equipment) (also called a Mobile Station (MS)), such as a mobile telephone (also known as a cellular or cell phone), or a tablet Personal Computer (PC) with wireless communication capability may communicate voice and/or data signals with one or more mobile communication networks. Wireless communication between the UE and the mobile communication networks may be performed using various Radio Access Technologies (RATs), including RATs specified by the Third Generation Partnership Project (3GPP) (referred to herein as 3GPP RATs) and RATs not specified by 3GPP (referred to herein as non-3GPP RATs). Non-3GPP RATs may include Wireless-Fidelity (Wi-Fi) technology, Bluetooth (BT) technology, Zigbee technology, and others, while 3GPP RATs may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Long Term Evolution (LTE) technology, TD-LTE technology, LTE-Advanced (LTE-A) technology, New Radio (NR) technology, etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

Figure 1A:
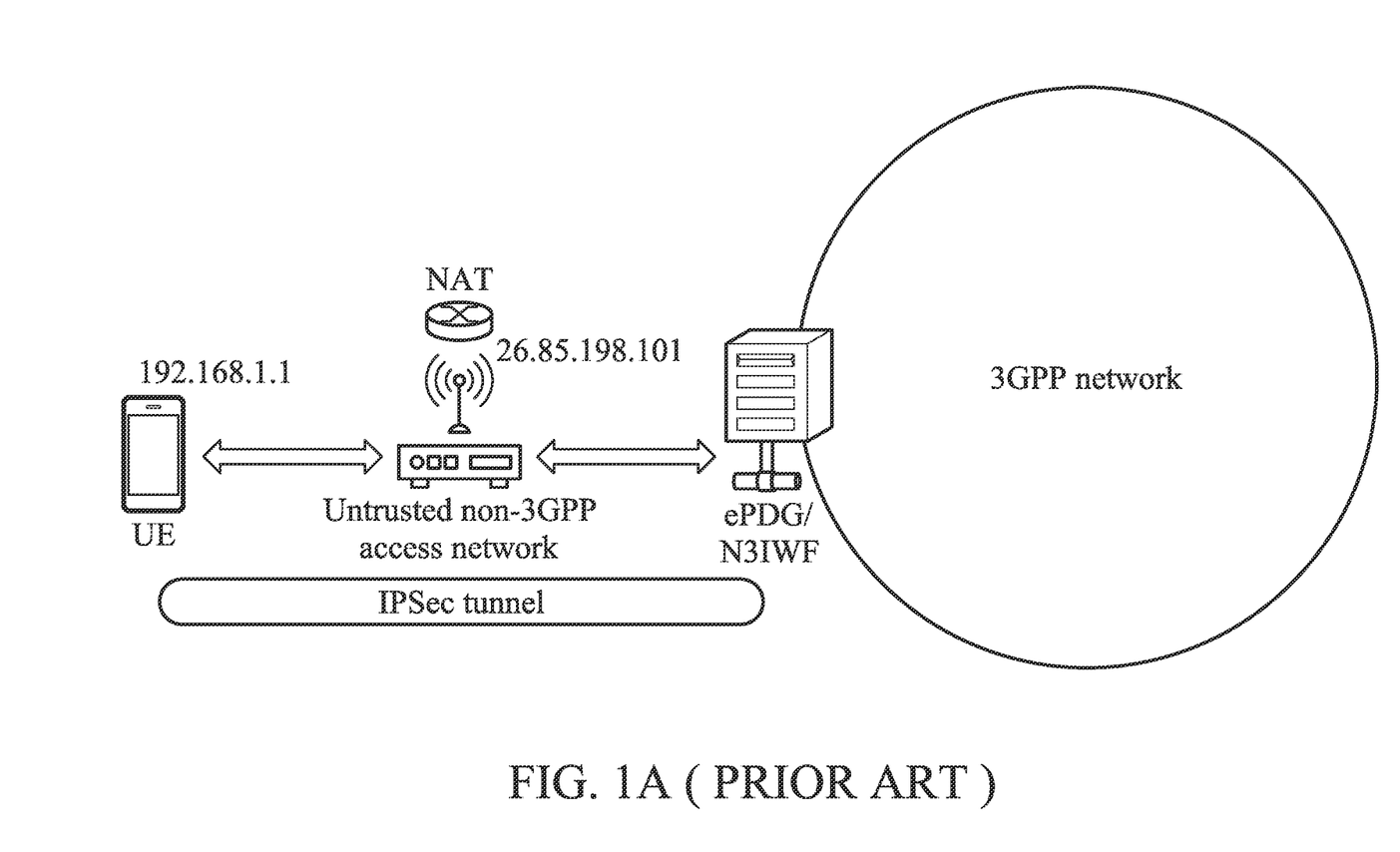
FIG. 1A is a schematic diagram illustrating that the UE behind the NAT environment accesses the 3GPP network through the untrusted non-3GPP access network.

Usually, a UE may be behind a network address translation (NAT) environment provided by an untrusted non-3GPP access network, such as a Wi-Fi Hotspot, and it may access a 3GPP network through the untrusted non-3GPP access network. FIG. 1A is a schematic diagram illustrating the UE behind the NAT environment accessing a 3GPP network through an untrusted non-3GPP access network, wherein the public IP address of the untrusted non-3GPP access network is 26.85.198.101.

Figure 1B:
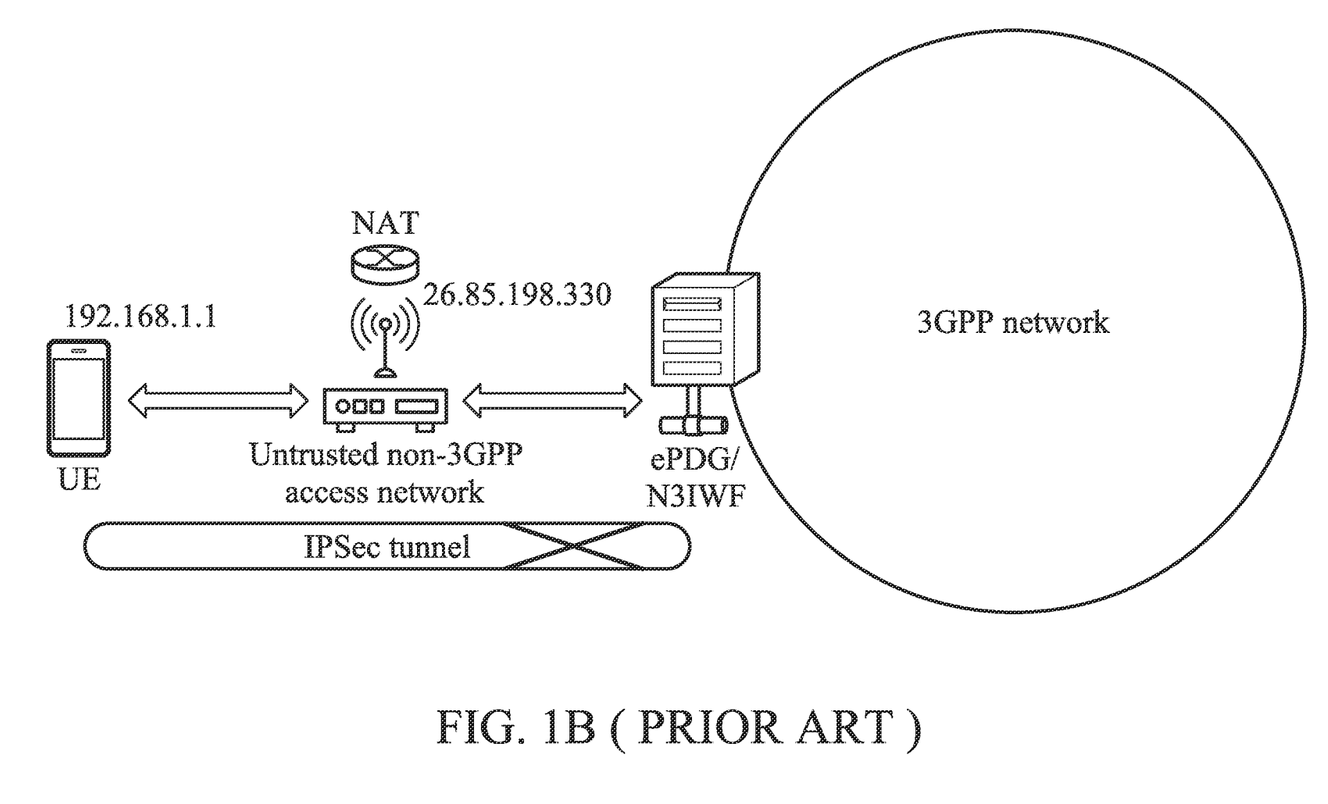
FIG. 1B is a schematic diagram illustrating that the Internet protocol security (IPSec) tunnel may not work when the public IP address of the untrusted non-3GPP access network changes.

However, as shown in FIG. 1B, when the public IP address of the untrusted non-3GPP access network changes (for example, when a smartphone is used as a Wi-Fi Hotspot and mobile data is switched off and on) from 26.85.198.101 to 26.85.198.330 and the UE does not receive any notification that the public IP address has changed, an Internet protocol security (IPSec) tunnel between the UE and the evolved packet data gateway (ePDG)/non-3GPP interworking function (N3IWF) may not work anymore, since the outer IP address of the IPSec tunnel has not updated on the ePDG/N3IWF.

This may cause a voice-over-WiFi (VoWiFi) call drop, a non-access stratum (NAS) signaling failure, or another similar problem when there is no 3GPP radio access network (RAN) that the UE can access or when the UE is in a flight mode.

Therefore, there is a need for a method and mobile communications device for maintaining mobile communication continuity to solve the above problems and achieve the purpose of maintaining the mobile communication continuity.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and mobile communications device for maintaining mobile communication continuity to overcome the above disadvantages.

In an exemplary embodiment, method for maintaining mobile communication continuity, executed by a mobile communications device, the method comprising: starting a timer when the mobile communications device receives a service packet from or transmits a service packet to a network; and detecting whether the network is reachable and whether a network address translation (NAT) mapping has changed when the mobile communications device does not receive a specific packet and the timer expires.

In some embodiments, a period of the timer is less than a disconnection timeout period of a service corresponding to the specific packet.

In some embodiments, the specific packet is a real-time transport protocol (RTP) packet, and the disconnection timeout period is a call drop time period based on the RTP.

In some embodiments, the specific packet is a real-time transport control protocol (RTCP) packet, and the disconnection timeout period is a call drop time period based on the RTCP.

In some embodiments, the specific packet is a transmission control protocol acknowledge (TCP ACK) packet, and the disconnection timeout period is a TCP timeout period of non-access stratum (NAS) signaling.

In some embodiments, the disconnection timeout period of the service is preset by the mobile communications device or is obtained through communication with the network in advance.

In some embodiments, the method further comprises sending an update request message to the network to request an update of at least one of a public IP address and a user datagram protocol (UDP) port in response to the network being reachable and the NAT mapping having changed.

In some embodiments, detecting whether the NAT mapping has changed comprises: sending a request message to the network to request a current hash value; comparing the current hash value with a previous hash value stored in the mobile communications device after receiving the current hash value; and determining that the NAT mapping has changed when the current hash value is different from the previous hash value.

In some embodiments, the current hash value and the previous hash value are NAT detection (NATD) hash values.

In an exemplary embodiment, A mobile communications device for maintaining mobile communication continuity, comprising: a wireless transceiver, configured to perform wireless transmission and reception to and from a network; and a controller, coupled to the wireless transceiver, and configured to: start a timer when the mobile communications device receives a service packet from or transmits a service packet to the network; and detect whether the network is reachable and whether a network address translation (NAT) mapping has changed when the mobile communications device does not receive a specific packet and the timer expires.

BRIEF DESCRIPTION OF DRAWINGS

The application can be more fully understood by reading the subsequent detailed description and examples with references made to the accompanying drawings, wherein.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 2:
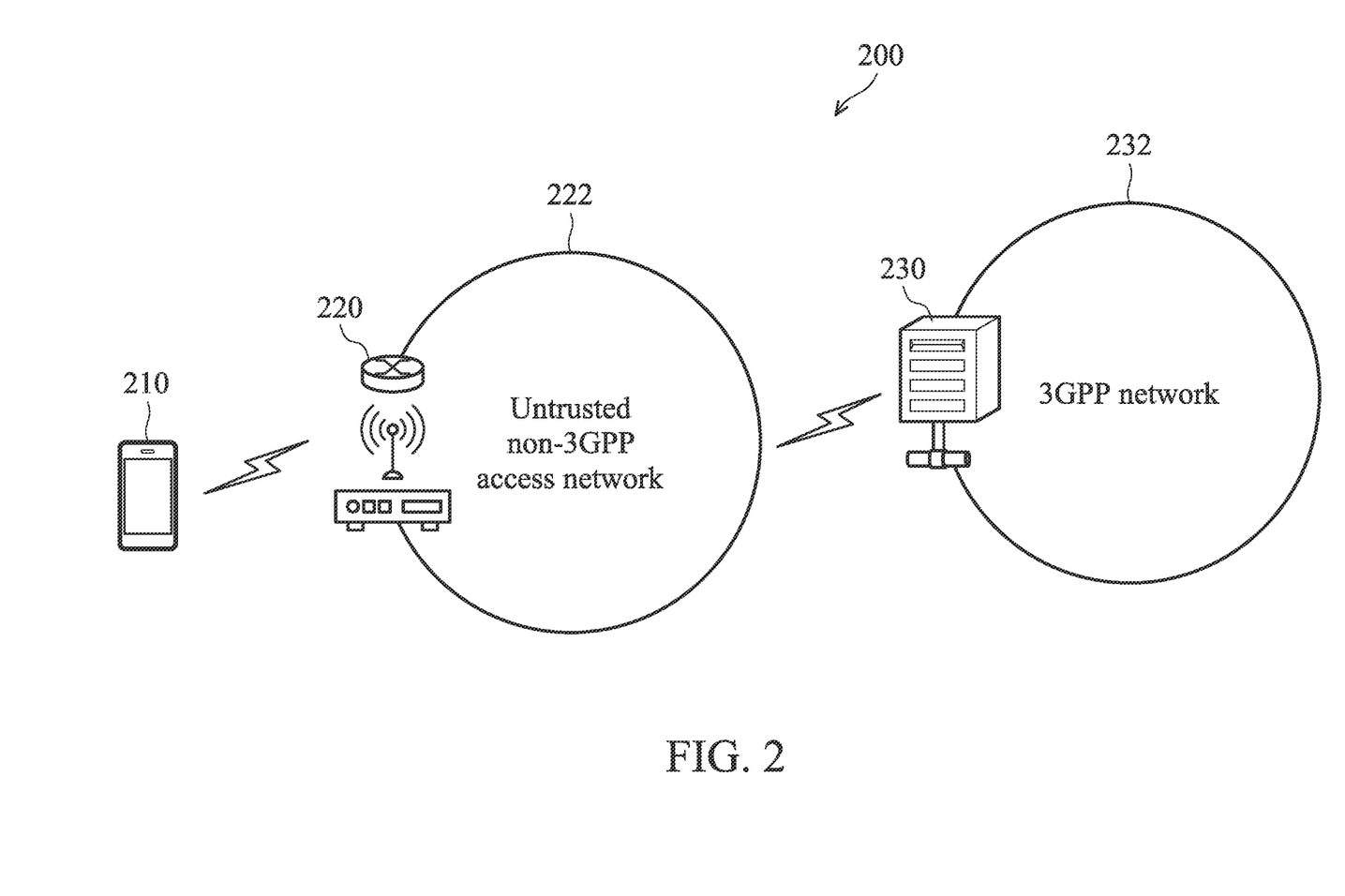
FIG. 2 is a block diagram of a mobile communication environment according to an embodiment of the disclosure.

FIG. 2 is a block diagram of a mobile communication environment 200 according to an embodiment of the disclosure.

As shown in FIG. 2, the mobile communication environment 200 includes a UE 210, a network address translation (NAT) device 220, an untrusted non-3GPP access network 222, a non-3GPP interworking gateway 230 and a 3GPP network 232.

The UE 210 may be a feature phone, a smartphone, a panel Personal Computer (PC), a laptop computer, a Machine Type Communication (MTC) device, or any mobile communication device supporting the RAT(s) utilized by the untrusted non-3GPP access network 222 and the 3GPP network 232. The UE 210 may establish an Internet protocol secure (IPsec) tunnel with the non-3GPP interworking gateway 230 and may access the 3GPP network 232 via the IPsec tunnel to obtain mobile services (e.g., voice and/or data services).

The NAT device 220 is located between two different address realms and has two IP addresses associated with the two different address realms, respectively. Taking the address translation between the public network and private network as an example, the NAT device 220 has a public IP address, known as an outer IP address, which can be correctly routed in the public network, and a private IP address, known as an inner IP address, which can be correctly routed in the private network. Specifically, the NAT device 220 translates the private IP address currently used by the UE 210 to a public IP address that is routable within a public network, such as the untrusted non-3GPP access network 222. The NAT device 220 may be any type of device configured to provide network address translation. By way of example, the NAT device 220 may be a Wi-Fi access point (AP), a wireless router, and the like.

The untrusted non-3GPP access network 222 is behind the NAT device 220 that performs NAT and may be a wireless network utilizing an RAT not specified by 3GPP. For example, the untrusted non-3GPP access network 222 may be a Wi-Fi network or any future evolution of the Wi-Fi network, a BT network, a Zigbee network, a WiMAX network, or a CDMA network, or a fixed network (e.g., a Digital Subscriber Line (DSL) network), depending on the RAT in use.

The non-3GPP interworking gateway 230 is responsible for enabling interoperability between the untrusted non-3GPP access network 222 and the 3GPP network 242.

Specifically, the non-3GPP interworking gateway 230 may use the Internet Key Exchange version 2 (IKEv2) protocol to provide the IPsec tunnel between the UE 210 and the 3GPP network 232 over the untrusted non-3GPP access network 222. In one example, each non-3GPP interworking gateway is an evolved Packet Data Gateway (ePDG) if the 3GPP network 232 is a 4G network. In another example, each non-3GPP interworking gateway is a Non-3GPP Inter-Working Function (N3IWF) if the 3GPP network 232 is a 5G network.

The 3GPP network 232 may be a 4G network (e.g., LTE/LTE-A/TD-LTE network) or a 5G network (e.g., NR network), or any further evolution of the 5G network, depending on the RAT in use. To clarify further, the 3GPP network 232 may include an access network and a core network (not shown). The access network is responsible for processing radio signals, terminating radio protocols, and connecting the UE 210 with the core network (if UE 210 chooses the access the 3GPP network 232 over 3GPP access), while the core network is responsible for performing mobility management, network-side authentication, and interfaces with public/external networks, such as the Internet and/or an IP Multimedia Subsystem (IMS).

In one example, if the 3GPP network 232 is a 4G network, the access network may be an Evolved-Universal Terrestrial Radio Access Network (E-UTRAN) and the core network may be an Evolved Packet Core (EPC). The E-UTRAN may include at least an evolved NodeB (eNB) (e.g., a macro eNB, femto eNB, or pico eNB). The EPC may include a Home Subscriber Server (HSS), a Mobility Management Entity (MME), a Serving Gateway (S-GW), and a Packet Data Network Gateway (PDN-GW or P-GW).

In another example, if the 3GPP network 232 is a 5G network, the access network may be a Next Generation Radio Access Network (NG-RAN) and the core network may be a Next Generation Core Network (NG-CN) (i.e., 5G Core Network (5GC)). The NG-RAN may include one or more gNBs. Each gNB may further include one or more Transmission Reception Points (TRPs), and each gNB or TRP may be referred to as a 5G cellular station forming one or more cells, wherein some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), and an Authentication Server Function (AUSF), wherein each network function may be implemented as a network element on dedicated hardware, or as a software instance running on dedicated hardware, or as a virtualized function instantiated on an appropriate platform, e.g., a cloud infrastructure.

Figure 3:
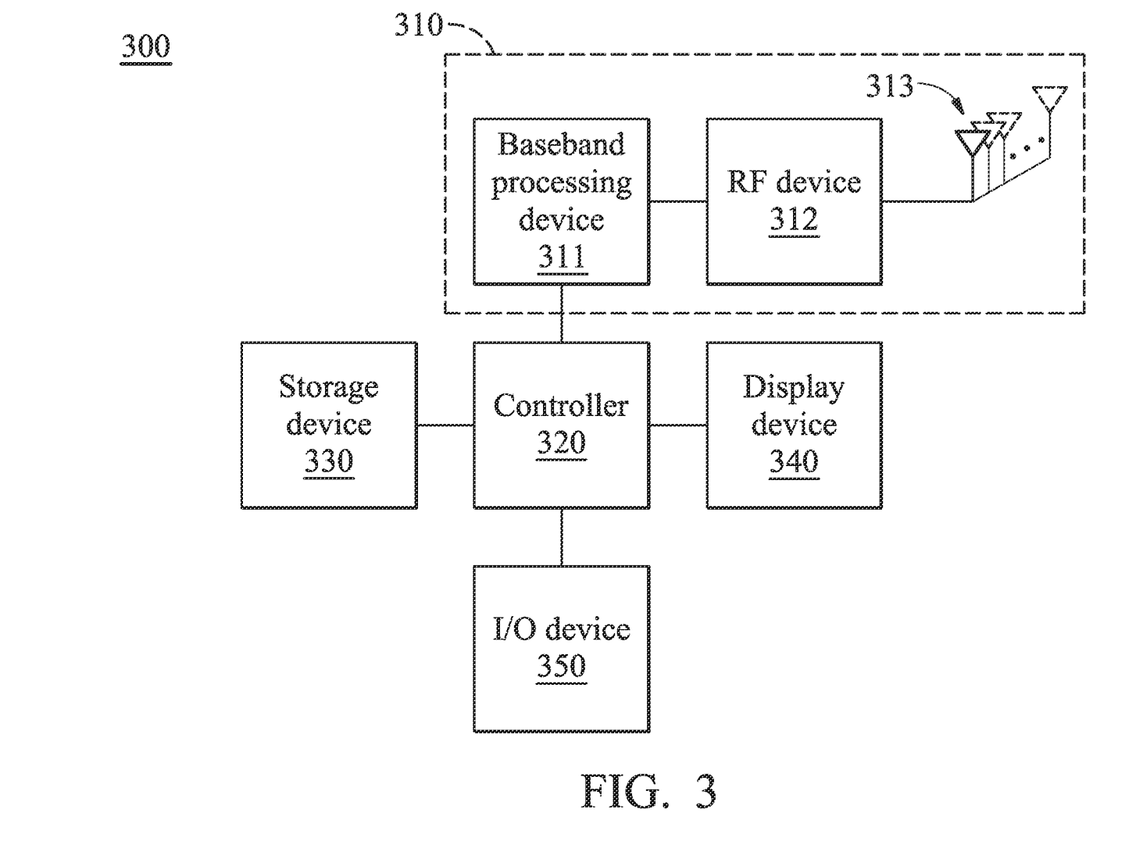
FIG. 3 is a block diagram illustrating a mobile communications device according to an embodiment of the disclosure.

FIG. 3 is a block diagram illustrating a mobile communications device 300 according to an embodiment of the disclosure, wherein the mobile communications device 300 may refer to a UE (e.g., the UE 210).

As shown in FIG. 3, the mobile communications device 300 may include a wireless transceiver 310, a controller 320, a storage device 330, a display device 340, and an Input/Output (I/O) device 350.

The wireless transceiver 310 is configured to perform wireless transmission and reception to and from the untrusted non-3GPP access network 222 and/or the access network of the 3GPP network 232. Specifically, the wireless transceiver 310 may include a baseband processing device 311, a Radio Frequency (RF) device 312, and antenna 313, wherein the antenna 313 may include an antenna array for beamforming.

The baseband processing device 311 is configured to perform baseband signal processing. The baseband processing device 311 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 312 may receive RF wireless signals via the antenna 313, convert the received RF wireless signals to baseband signals, which are processed by the baseband processing device 311, or receive baseband signals from the baseband processing device 311 and convert the received baseband signals to RF wireless signals, which are later transmitted via the antenna 313. The RF device 312 may also contain multiple hardware devices to perform radio frequency conversion. For example, the RF device 312 may comprise a mixer to multiply the baseband signals with a carrier oscillated in the radio frequency of the supported RAT(s), wherein the radio frequency may be 900 MHz, 2100 MHz, or 2.6 GHz utilized in 4G LTE/LTE-A/TD-LTE technology, or may be any radio frequency (e.g., 30 GHz-300 GHz for mmWave) utilized in the 5G NR technology, or another radio frequency, depending on the RAT in use.

The controller 320 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 310 for wireless communication with the untrusted non-3GPP access network 222 and/or the access network of the 3GPP network 232, storing and retrieving data (e.g., program code) to and from the storage device 330, sending a series of frame data (e.g. representing text messages, graphics, images, etc.) to the display device 340, and receiving user inputs or outputting signals via the I/O device 350.

In particular, the controller 320 coordinates the aforementioned operations of the wireless transceiver 310, the storage device 330, the display device 340, and the I/O device 350 for performing the method of latency reduction for positioning-specific measurement reporting.

In another embodiment, the controller 320 may be incorporated into the baseband processing device 311, to serve as a baseband processor.

As will be appreciated by persons skilled in the art, the circuits of the controller 320 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 330 may be a non-transitory machine-readable storage medium, including a non-volatile memory (e.g., a FLASH memory or a Non-Volatile Random Access Memory (NVRAM)), or a Universal Integrated Circuit Card (UICC) (e.g., a Subscriber Identity Module (SIM) or Universal SIM (USIM)), or a magnetic storage device (e.g., a hard disk or a magnetic tape), or an optical disc, or any combination thereof for storing data (e.g., a priority list of ePDGs/N3IWFs information), instructions, and/or program code of applications, communication protocols (e.g., the Internet Key Exchange version 2 (IKEv2) protocol and the 4G/5G protocol), and/or the method of the present application. In one example, the method of the present application may be implemented as part of the 4G/5G protocol. A 4G/5G protocol stack may include a Non-Access-Stratum (NAS) layer to communicate with an AMF/SMF/MME entity in the 3GPP core network, and an Access Stratum (AS) layer consisting of multiple sublayers, such as a Radio Resource Control (RRC) sublayer for high layer configuration and control of, a Packet Data Convergence Protocol/Radio Link Control (PDCP/RLC) sublayer, a Media Access Control (MAC) sublayer, and a Physical (PHY) sublayer.

The display device 340 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 350 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 3 are for illustrative purposes only and are not intended to limit the scope of the application. For example, the mobile communications device may include more components, such as a power supply, or a Global Positioning System (GPS) device, wherein the power supply may be a mobile/replaceable battery providing power to all the other components of the mobile communications device (e.g., a UE), and the GPS device may provide the location information of the mobile communications device (e.g., a UE) for use of some location-based services or applications. Alternatively, the mobile communications device may include fewer components. For example, the mobile communications device (e.g., a UE) may not include the display device 340 and/or the I/O device 350.

Figure 4:
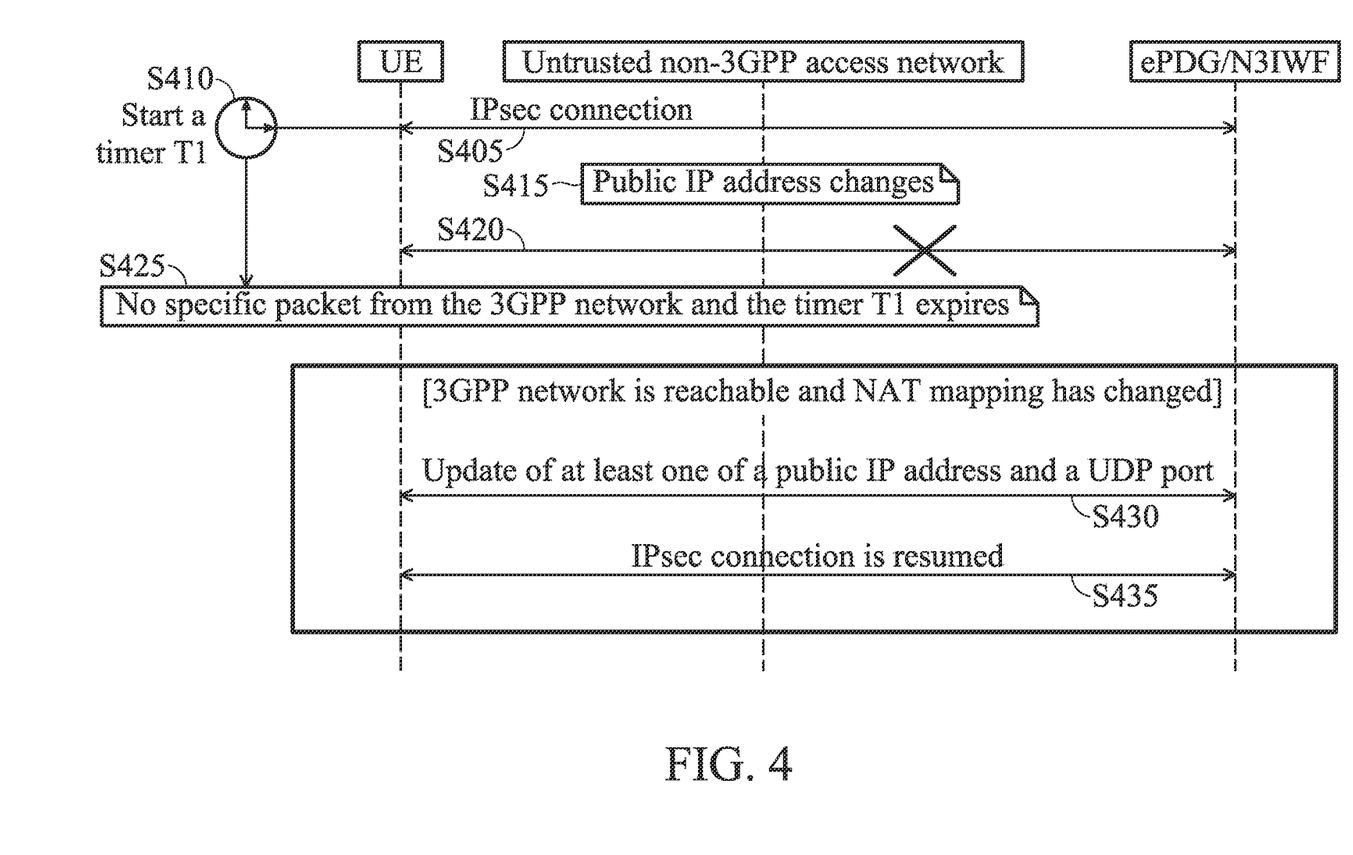
FIG. 4 is a message sequence chart illustrating an exemplary procedure for maintaining the mobile communication continuity between a UE, an untrusted non-3GPP access network and an ePDG/N3IWF when the public IP address of the untrusted non-3GPP access network changes according to an embodiment of the disclosure.

FIG. 4 is a message sequence chart illustrating an exemplary procedure for maintaining the mobile communication continuity between a UE, an untrusted non-3GPP access network and an ePDG/N3IWF when the public IP address of the untrusted non-3GPP access network changes according to an embodiment of the disclosure.

In step S405, the UE establishes an Internet protocol secure (IPsec) connection via the IPsec tunnel the ePDG/N3IWF to access the 3GPP network.

In step S410, the UE starts a timer T1 at the same time when the UE receives a service packet from or transmits a service packet to the 3GPP network during the IPsec connection.

In step S415, the public IP address of the untrusted non-3GPP access network changes.

In step S420, the IPsec connection does not work since the public IP address of the untrusted non-3GPP access network changes.

In step S425, when the UE does not receive a specific packet and the timer T1 expires, the UE detects whether the 3GPP network is reachable and whether the NAT mapping has changed, wherein a period of the timer T1 is less than a disconnection timeout period of a service corresponding to the specific packet, and the disconnection timeout period of the service is preset by the UE or is obtained through communication with the 3GPP network in advance.

In step S430, the UE sends an update request message to the 3GPP network to request an update of the public IP address, the user datagram protocol (UDP) port, or both in response to the 3GPP network being reachable and the NAT mapping having changed.

In step S435, the IPsec connection is resumed, and the UE may access the 3GPP network over the IPsec tunnel again.

Figure 5:
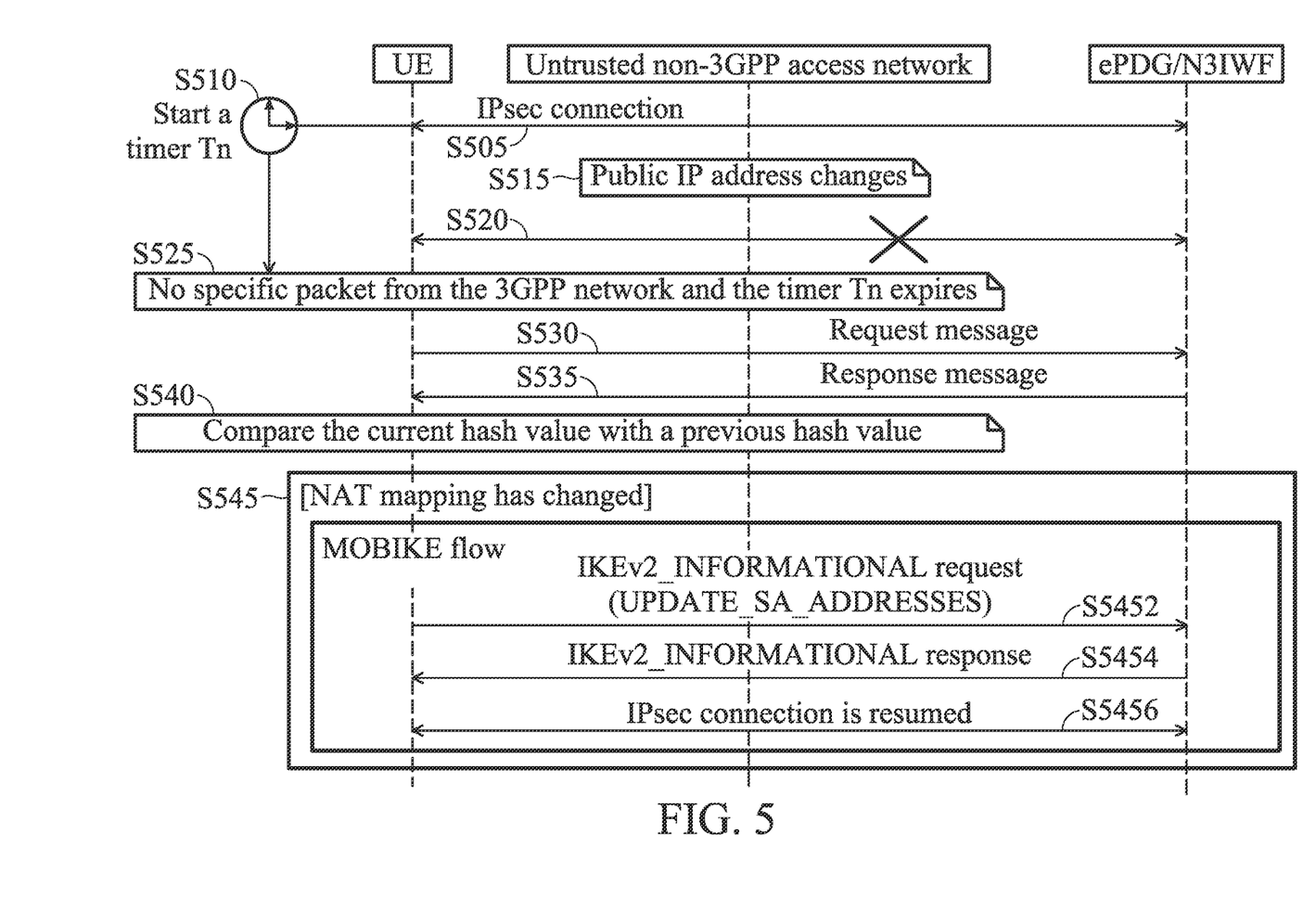
FIG. 5 is a message sequence chart illustrating an exemplary procedure for maintaining the mobile communication continuity between a UE, an untrusted non-3GPP access network and an ePDG/N3IWF when the public IP address of the untrusted non-3GPP access network changes according to an embodiment of the disclosure.

FIG. 5 is a message sequence chart illustrating an exemplary procedure for maintaining the mobile communication continuity between a UE, an untrusted non-3GPP access network (such as Wi-Fi Hotspot) and an ePDG/N3IWF when the public IP address of the untrusted non-3GPP access network changes according to an embodiment of the disclosure.

The exchange of messages in FIG. 5 between various devices can be achieved by using an extension to IKEv2, known as the Mobility and Multihoming Protocol (MOBIKE). MOBIKE is a protocol that the UE does not need to establish new IKE Security Associations (SAs) and IPsec SAs, when the UE moves and the IP address of it changes or when the UE obtains new IP addresses for multihoming.

In step S505, the UE establishes an Internet protocol secure (IPsec) connection via the IPsec tunnel with the ePDG/N3IWF to access the 3GPP network.

In step S510, the UE starts a timer Tn at the same time when the UE receives a service packet from or transmits a service packet to the 3GPP network during the IPsec connection.

In step S515, the public IP address of the untrusted non-3GPP access network changes.

In step S520, the IPsec connection does not work since the public IP address of the untrusted non-3GPP access network changes.

In step S525, when the UE does not receive a specific packet and the timer Tn expires, the UE detects whether the 3GPP network is reachable and whether the NAT mapping has changed, wherein a period of the timer Tn is less than a disconnection timeout period of a service corresponding to the specific packet, and the disconnection timeout period of the service is preset by the UE or is obtained through communication with the 3GPP network in advance.

Specifically, the UE may start different timers for different services respectively. Here are some examples to illustrate.

Example 1

The UE starts a timer T1 to determine whether a real-time transport protocol (RTP) packet is received from the 3GPP network during a period of the timer T1 when the UE operates a service, such as VoWiFi in-call, wherein the period of the timer T1 is less than a disconnection timeout period of the service corresponding to the RTP packet and the disconnection timeout period is the call drop time period that the 3GPP network waits before dropping the communication based on the RTP.

Example 2

The UE starts a timer T2 to determine whether a real-time transport control protocol (RTCP) packet is received from the 3GPP network during a period of the timer T2 when the UE operates a service, such as VoWiFi hold-call, wherein the period of the timer T2 is less than a disconnection timeout period of the service corresponding to the RTCP packet and the disconnection timeout period is the call drop time period that the 3GPP network waits before dropping the communication based on the RTCP.

Example 3

The UE starts a timer T3 to determine whether a transmission control protocol acknowledge (TCP ACK) packet is received from the 3GPP network during a period of the timer T3 after sending a non-access stratum (NAS) signaling packet, wherein the period of the timer T3 is less than a disconnection timeout period that is a TCP timeout period of NAS signaling.

In step S530, the UE sends a request message (e.g., an IKEv2 INFORMATIONAL request) to the 3GPP network to request a current hash value, wherein the current hash value may be a NAT detection (NATD) hash value.

In step S535, the UE receives a response message (e.g., an IKEv2 INFORMATIONAL response) containing a current hash value from the 3GPP network.

In step S540, the UE compares the current hash value with a previous hash value stored in the UE after receiving the current hash value, wherein the previous hash value may be a NATD hash value.

In step S545, the UE determines that the NAT mapping has changed and performs a MOBIKE flow to update the public IP address when the current hash value is different from the previous hash value. Specifically, in step S5452 of the MOBIKE flow, the UE may update its public IP address by sending an IKEv2 INFORMATIONAL request that includes an UPDATE SA ADDRESSES notification. The IKEv2 INFORMATIONAL request is sent by the UE through a new path using the new public IP address, wherein the new public IP address translated from a local IP address by the untrusted non-3GPP access network is used as a source address for the UE's outgoing traffic. Upon receiving the UPDATE SA ADDRESSES notification, the ePDG/N3IWF records the new public IP address and performs a return routability check of the new public IP address. When the check completes, the ePDG/N3IWF returns an IKEv2 INFORMATIONAL response to the UE in step S5454 of the MOBIKE flow and starts to use the new public IP address as the destination address for the UE's outgoing traffic. In step S5456 of the MOBIKE flow, the IPsec connection is resumed, and the UE may access the 3GPP network over the IPsec tunnel again.

Figure 6:
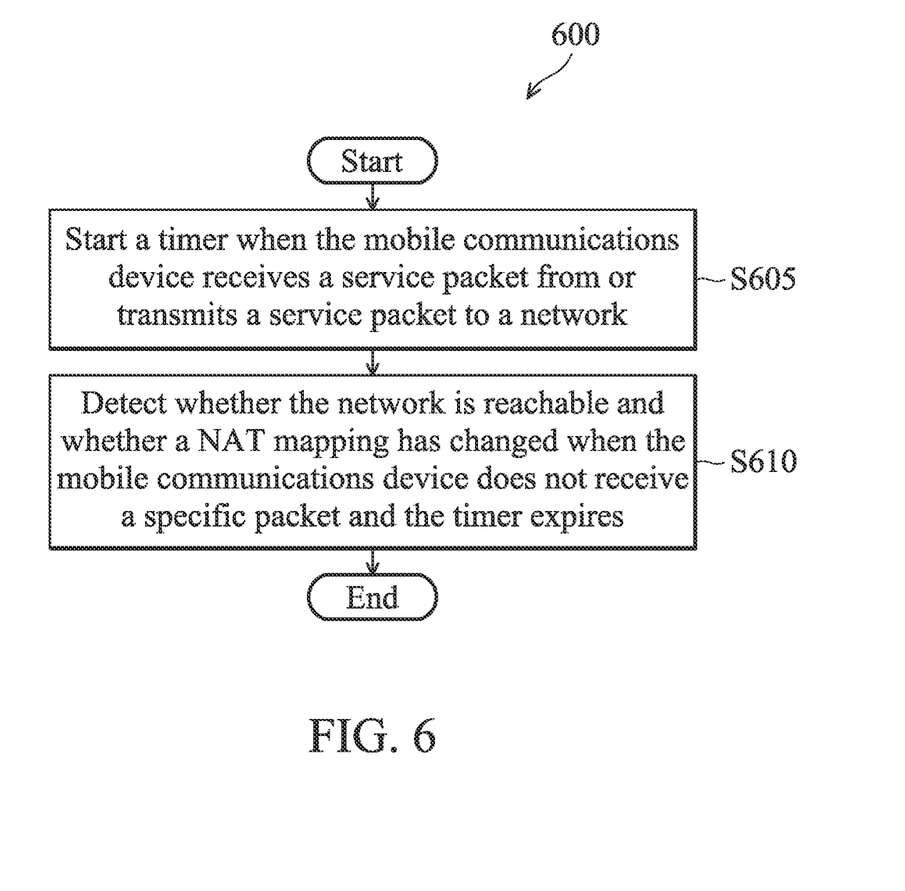
FIG. 6 is a flowchart illustrating the method for maintaining mobile communication continuity according to an embodiment of the disclosure.

FIG. 6 is a flowchart 600 illustrating the method for maintaining mobile communication continuity according to an embodiment of the disclosure, wherein the method is applied to and executed by a mobile communications device (e.g., the UE 210).

In step S605, the mobile communications device starts a timer when the mobile communications device receives a service packet from or transmits a service packet to a network, wherein the network is a 3GPP network behind a network address translation (NAT) device.

In step S610, the mobile communications device detects whether the network is reachable and whether a NAT mapping has changed when the mobile communications device does not receive a specific packet and the timer expires, wherein a period of the timer is less than a disconnection timeout period of a service corresponding to the specific packet, and the disconnection timeout period of the service is preset by the mobile communications device, or is obtained through communication with the network in advance.

As shown above, the UE may keep the IPsec connection active to avoid losing the service continuity by using the method and mobile communications device for maintaining mobile communication continuity provided in the present disclosure while the public IP address of the untrusted non-3GPP access network changes.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for maintaining mobile communication continuity, executed by a mobile communications device, the method comprising:
   starting a timer when the mobile communications device receives a service packet from or transmits a service packet to a network; and
   detecting whether the network is reachable and whether a network address translation (NAT) mapping has changed when the mobile communications device does not receive a specific packet and the timer expires;
   wherein the detecting whether the NAT mapping has changed comprises:
   sending a request message to the network to request a current hash value;
   comparing the current hash value with a previous hash value stored in the mobile communications device after receiving the current hash value; and
   determining that the NAT mapping has changed when the current hash value is different from the previous hash value.

2. The method as claimed in claim 1, wherein a period of the timer is less than a disconnection timeout period of a service corresponding to the specific packet.

3. The method as claimed in claim 2, wherein the specific packet is a real-time transport protocol (RTP) packet, and the disconnection timeout period is a call drop time period based on the RTP.

4. The method as claimed in claim 2, wherein the specific packet is a real-time transport control protocol (RTCP) packet, and the disconnection timeout period is a call drop time period based on the RTCP.

5. The method as claimed in claim 2, wherein the specific packet is a transmission control protocol acknowledge (TCP ACK) packet, and the disconnection timeout period is a TCP timeout period of non-access stratum (NAS) signaling.

6. The method as claimed in claim 2, wherein the disconnection timeout period of the service is preset by the mobile communications device or is obtained through communication with the network in advance.

7. The method of claim 1, further comprising:
sending an update request message to the network to request an update of at least one of a public IP address and a user datagram protocol (UDP) port in response to the network being reachable and the NAT mapping having changed.

8. The method of claim 1, wherein the current hash value and the previous hash value are NAT detection (NATD) hash values.

9. A mobile communications device for maintaining mobile communication continuity, comprising:
a wireless transceiver, configured to perform wireless transmission and reception to and from a network; and
a controller, coupled to the wireless transceiver, and configured to:
start a timer when the mobile communications device receives a service packet from or transmits a service packet to the network; and
detect whether the network is reachable and whether a network address translation (NAT) mapping has changed when the mobile communications device does not receive a specific packet and the timer expires;
wherein the detecting whether the NAT mapping has changed comprises:
sending a request message to the network to request a current hash value;
comparing the current hash value with a previous hash value stored in the mobile communications device after receiving the current hash value; and
determining that the NAT mapping has changed when the current hash value is different from the previous hash value.

10. The mobile communications device of claim 9, wherein a period of the timer is less than a disconnection timeout period of a service corresponding to the specific packet.

11. The mobile communications device of claim 10, wherein the specific packet is a real-time transport protocol (RTP) packet, and the disconnection timeout period is a call drop time period based on the RTP.

12. The mobile communications device of claim 10, wherein the specific packet is a real-time transport control protocol (RTCP) packet, and the disconnection timeout period is a call drop time period based on the RTCP.

13. The mobile communications device as claimed in claim 10, wherein the specific packet is a transmission control protocol acknowledge (TCP ACK) packet, and the disconnection timeout period is a TCP timeout period of non-access stratum (NAS) signaling.

14. The mobile communications device as claimed in claim 10, wherein the disconnection timeout period of the service is preset by the mobile communications device or is obtained through communication with the network in advance.

15. The mobile communications device as claimed in claim 9, wherein the controller is further configured to:
send an update request message to the network to request an update of at least one of a public IP address and a user datagram protocol (UDP) port in response to the network being reachable and the NAT mapping having changed.

16. The mobile communications device of claim 9, wherein the current hash value and the previous hash value are NATD hash values.

* * * * *